(12) United States Patent
Kodama et al.

(10) Patent No.: US 7,278,512 B2
(45) Date of Patent: Oct. 9, 2007

(54) VARIABLE GEAR RATIO HYDRAULIC POWER STEERING DEVICE

(75) Inventors: Kazumasa Kodama, Toyota (JP); Hirozumi Eki, Okazaki (JP); Satoru Mikamo, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 188 days.

(21) Appl. No.: 11/052,061

(22) Filed: Feb. 8, 2005

(65) Prior Publication Data
US 2005/0178607 A1    Aug. 18, 2005

(30) Foreign Application Priority Data
Feb. 13, 2004    (JP) .............................. 2004-037223

(51) Int. Cl.
*B62D 5/06* (2006.01)
(52) U.S. Cl. ...................................... 180/421; 180/422
(58) Field of Classification Search ................ 180/421, 180/422, 423, 405, 406, 407, 444
See application file for complete search history.

(56) References Cited

U.S. PATENT DOCUMENTS

| | | | |
|---|---|---|---|
| 3,172,299 A | 3/1965 | Musser | |
| 4,691,796 A | 9/1987 | Tanooka et al. | |
| 5,265,019 A | 11/1993 | Harara et al. | |
| 5,267,627 A | 12/1993 | Frank et al. | |

FOREIGN PATENT DOCUMENTS

| | | |
|---|---|---|
| DE | 100 23 584 A1 | 11/2001 |
| EP | 1 283 147 A2 | 2/2003 |
| EP | 1 359 083 A2 | 11/2003 |
| JP | 2-56274 | 11/1990 |
| JP | 10-324263 | 12/1998 |

*Primary Examiner*—Lesley D. Morris
*Assistant Examiner*—Marc A. Scharich
(74) *Attorney, Agent, or Firm*—Oblon, Spivak, McClelland, Maier & Neustadt, P.C.

(57) ABSTRACT

A variable gear ratio hydraulic power steering device 1 is provided with a variable ratio transmission mechanism 7 having a drive motor 70; a flow volume control valve 41 for controlling the discharge flow volume of an oil pump 10 which circulates operating fluid; and a steering angle sensor 310 for measuring a handle steering angle input to a steering handle 31. A valve controlling controller 50 is constructed to take thereinto a measured ACT angle which is the rotational angle of the drive motor 70 and to calculate a target ACT angle for the drive motor 70 based on the handle steering angle. Further, the valve controlling controller 50 controls the flow volume control valve 41 to make the discharge flow volume equal to or greater than a predetermined flow volume when the magnitude of a difference ACT angle which is the difference between the target ACT angle and the measured ACT angle is equal to or greater than a threshold value.

7 Claims, 9 Drawing Sheets

VARIABLE GEAR RATIO HYDRAULIC POWER STEERING DEVICE

This application claims priority under 35 U.S.C. 119 with respect to Japanese Application No. 2004-037223 filed on Feb. 13, 2004.

BACKGROUND OF THE INVENTION

1. Field of the Invention

The present invention relates to a hydraulic power steering device for use in motor vehicles or the like, and particularly, it relates to a variable gear ratio hydraulic power steering device with a variable steering gear ratio.

2. Discussion of the Related Art

Heretofore, as hydraulic power steering devices, there has been known one for example which is provided with a flow volume control valve for controlling the flow volume of operating fluid supplied from an oil pump to a power cylinder and which is constructed to control the flow volume control valve electronically, as disclosed for example in Japanese exampled, published patent No. 2-56274. In the power steering device, a vehicle speed, a handle steering angle, a handle angular velocity and so on are taken as control inputs, and the discharge flow volume of the oil pump is regulated by controlling the valve opening degree of the flow volume control valve based on these control inputs. Thus, steering assist force to be generated is properly controlled by regulating the discharge flow volume of the oil pump, so that the handle steering feeling felt by the driver and the attainment of energy saving are aimed at being compatible with each other.

Also as hydraulic power steering devices, there has been known one for example which is provided with a variable ratio transmission mechanism for varying the rotation transmission ratio between a steering shaft coupled to a steering handle and a pinion shaft coupled to a pinion gear in engagement with a rack gear and which is constructed to make the steering gear ratio variable, as disclosed for example in Japanese unexampled, published patent application No. 10-324263. With the variable ratio transmission mechanism, it can be realized to set the steering gear ratio to a quick side in a low speed range for reduction of the handle steering amount by the driver and to set the steering gear ratio to a slow side in a high speed range for enhancement of the traveling stability.

Further, as hydraulic power steering devices, there has been known a variable gear ratio power steering device for example which is constituted by combining the aforementioned flow volume control mechanism for controlling the discharge flow volume of the oil pump with the aforementioned variable ratio transmission mechanism for making the rotation transmission ratio variable.

However, the variable gear ratio hydraulic power steering device in the prior art involves the following problems. That is, since the operation of the variable ratio transmission mechanism causes the steering gear ratio to fluctuate, variation occurs in the flow volume of operating fluid required by a power cylinder. When the discharge flow volume of the oil pump runs short less than the required flow volume, it tends to occur that the steering assist force to be generated runs short, whereby a large force is needed to manipulate the steering handle.

On the contrary, it is possible for example to set the discharge flow volume for the state that the steering gear ratio is set by the variable ratio transmission mechanism to the end of the quick side. However, in the case so set, it tends to occur that the substantial part of the discharge flow volume from the oil pump is consumed uselessly with the energy saving degraded in effect.

SUMMARY OF THE INVENTION

Accordingly, it is a primary object of the present invention to provide a variable gear ratio hydraulic power steering device in which the handle steering feeling felt by the driver is compatible with the achievement of energy saving.

Briefly, according to the present invention, there is provided a variable gear ratio hydraulic power steering device having a variable ratio transmission mechanism for varying the rotation transmission ratio between a first steering shaft coupled to a steering handle and a second steering shaft coupled to a pinion shaft, a transmission ratio controlling controller for controlling the variable ratio transmission mechanism, a flow volume control valve for controlling the discharge flow volume of an oil pump which circulates operating fluid, a valve controlling controller for controlling the flow volume control valve and a steering angle sensor for measuring a handle steering angle input to the steering-handle. In the power steering device, the variable ratio transmission mechanism is provided with a drive motor having a rotor and a stator combined and a rotational angle sensor for measuring a measured ACT angle which is the motor rotational angle of the drive motor, and is constructed to alter the rotation transmission ratio between the first and second steering shafts in dependence on the rotational operation of the drive motor. The transmission ratio controlling controller is constructed to take therein the handle steering angle measured by the steering angle sensor and to control the variable ratio transmission mechanism in dependence on at least the handle steering angle and a handle angular velocity which is obtained by time-differentiating the handle steering angle. The valve controlling controller is constructed to take therein the measured ACT angle and the handle steering angle and to calculate a target ACT angle which is a control target value of the motor rotational angle of the drive motor, in dependence on the handle steering angle. And, the valve controlling controller is also constructed to control the flow volume control valve so that the discharge flow volume is made to be equal to or greater than a predetermined flow volume when a difference ACT angle which is the difference between the target ACT angle and the measured ACT angle is equal to or greater than a threshold value and so that the discharge flow volume is made to be less than the predetermined flow volume when the difference ACT angle is less than the threshold value.

With this construction, the transmission ratio controlling controller in the variable gear ratio power steering device according to the present invention controls the variable ratio transmission mechanism by regulating the magnitude of supply electric power to the drive motor in dependence on at least the handle steering angle and the handle angular velocity.

Under the aforementioned control of the transmission ratio controlling controller, it may be the case that a threshold valve is set for the handle angular velocity in order to preclude erroneous operation caused by, for example, errors, noises or the like. Thus, when the steering handle is manipulated at a slower handle angular velocity than the threshold value, for example, there occurs a situation that the variable ratio transmission mechanism is controlled in dependence upon the handle steering angle only. In this situation, as the handle steering angle is increased, the supply electric power to the drive motor is increased. Then, steerable road wheels begin to be steered for the first time when a resultant force from the output power of the drive motor and the assist force generated by the variable gear ratio hydraulic power steering device exceeds a force required to operate the steerable road wheels.

On the other hand, in the power steering device according to the present invention, the valve controlling controller obtains the target ACT angle based on the handle steering angle and calculates the difference ACT angle which is the difference between the target ACT angle and the measured ACT angle. And, the valve controlling controller is constructed to control the flow volume control valve so that the discharge flow volume is made to be equal to or greater than the predetermined flow volume when the difference ACT angle is equal to or greater than the threshold value.

Thus, in the variable gear ratio power steering device according to the present invention, the difference ACT angle increases as the handle steering angle is increased, and when the difference ACT angle becomes equal to or greater than the threshold value, the discharge flow volume of the oil pump can be increased, whereby the variable gear ratio power steering device is enabled to responsively gain the steering assist force which it can generate.

Therefore, in the variable gear ratio power steering device, the discharge flow volume is increased with the operation of the variable ratio transmission mechanism. Thus, the resultant force from the output power of the drive motor and the steering assist force can be gained immediately without causing the oil pump to run short of the discharge flow volume, so that it can be realized to make earlier the timing when the steerable road wheels begin to move.

As described above, the variable gear ratio power steering device according to the present invention is early in the timing when the steerable road wheels begin to be steered and can be improved in the handle steering feeling.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

The present embodiment is an example relating to a variable gear ratio hydraulic power steering device which is constructed by incorporating a variable ratio transmission mechanism 7 into a hydraulic power steering device. The details of this will be described with reference to FIGS. 1 to 8.

Figure 1:
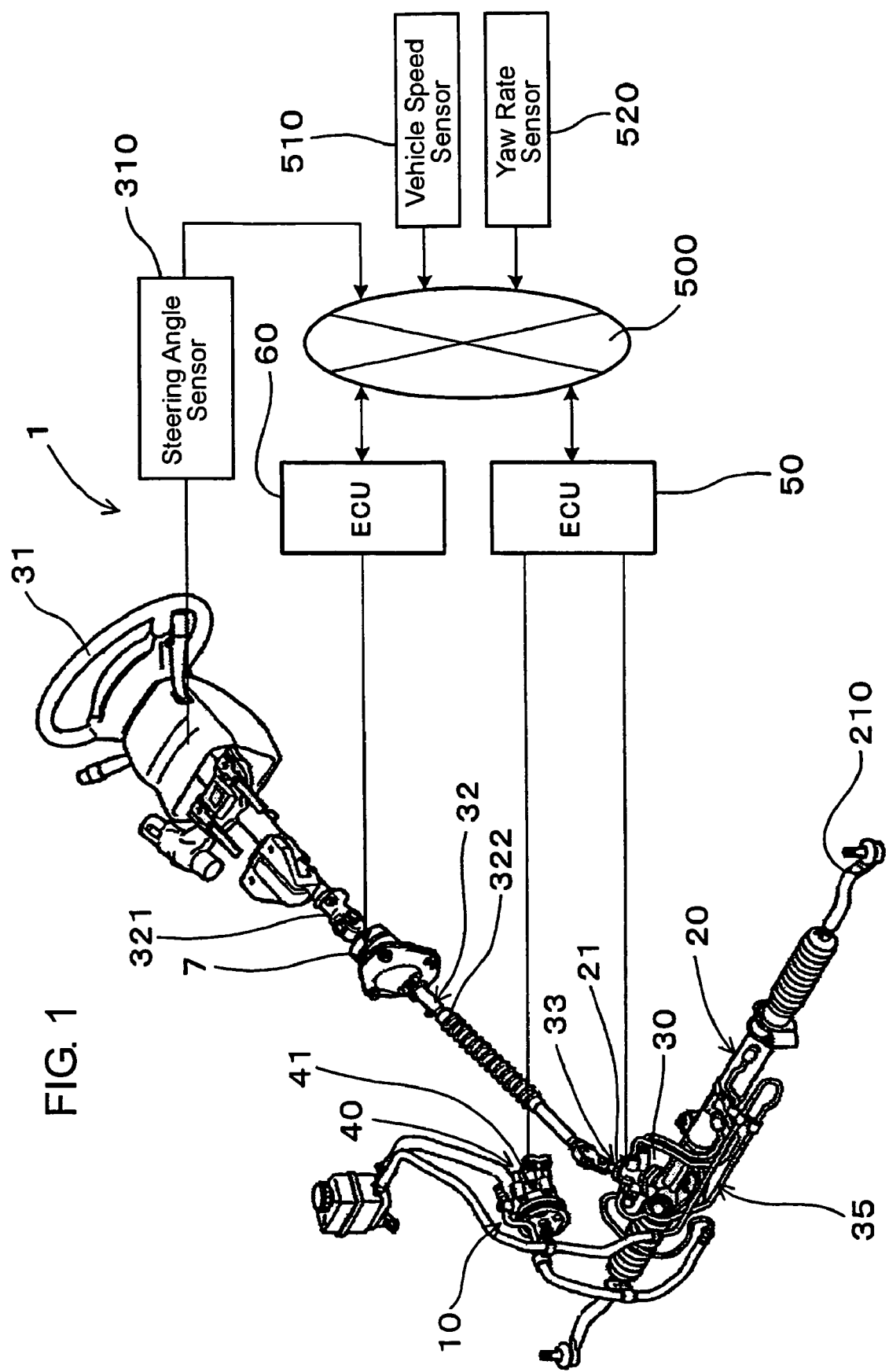
FIG. 1 is a perspective view showing a variable gear ratio power steering device in a first embodiment according to the present invention.

As shown in FIG. 1, the variable gear ratio hydraulic power steering device 1 in the present embodiment is provided with a first steering shaft 321 coupled to a steering handle 31, a second steering shaft 322 coupled to a pinion shaft 33, the variable ratio transmission mechanism 7 for making the rotation transmission ratio variable between the first and second steering shafts 321, 322, a transmission ratio controlling controller 60 for controlling the variable ratio transmission mechanism 7, a flow volume control valve 41 for controlling the discharge flow volume of an oil pump 10 which circulates operating fluid, a valve controlling controller 50 for controlling the flow volume control valve 41, and a steering angle sensor 310 for measuring a handle steering angle taken by a steering handle 31.

Figure 2:
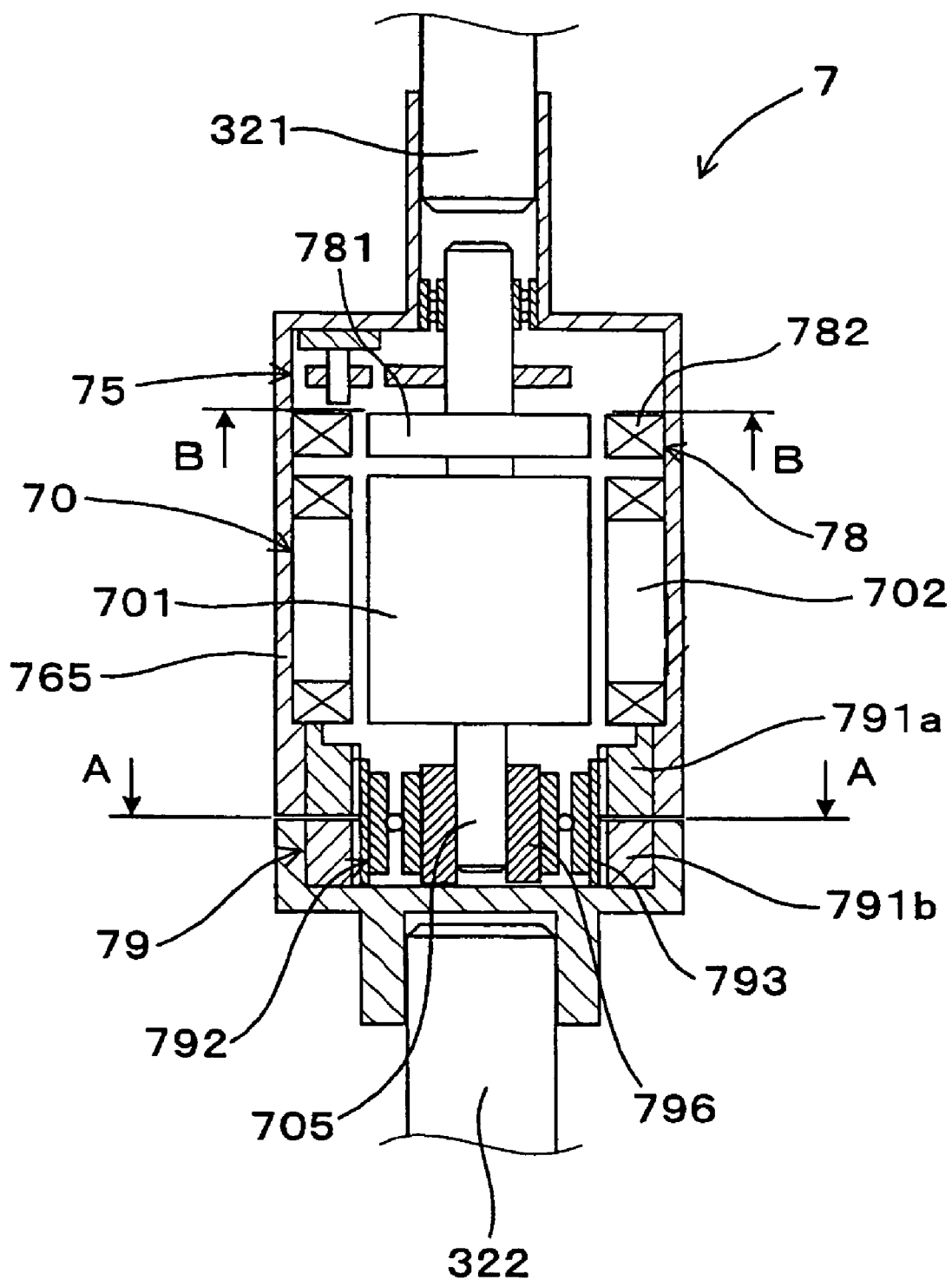
FIG. 2 is a sectional view showing the sectional structure of a variable ratio transmission mechanism in the first embodiment.

As shown in FIG. 2, the variable ratio transmission mechanism 7 is provided with a drive motor 70 combining a rotor 701 and a stator 702 and a rotational angle sensor 78 (e.g., resolver 78 in this embodiment) and is constructed to alter the rotation transmission ratio between the respective steering shafts 321 and 322 in dependence on the rotational operation of the drive motor 70.

The transmission ratio controlling controller 60 is constituted to take thereinto a handle steering angle measured by the steering angle sensor 310 and to control the variable ratio transmission mechanism 7 based on at least the handle steering angle and a handle angular velocity which is the time-differential of the handle steering angle.

The valve controlling controller 50 is constituted to take thereinto a measured ACT (actuator) angle and the handle steering angle and to calculate a target ACT angle which is a motor rotational angle as a control value to the drive motor 70, in dependence on the handle steering angle input thereto.

Further, the valve controlling controller 50 calculates a difference ACT angle which is the difference between the target ACT angle and the measured ACT angle. The controller 50 controls the flow volume control valve 41 to make the discharge flow volume equal to or greater than a predetermined flow volume when the difference ACT angle is equal to or greater than a threshold value and controls the flow volume control valve 41 to make the discharge flow volume less than the predetermined flow volume when the difference ACT angle is less than the threshold value.

The embodiment will be described hereinafter in detail.

As shown in FIG. 1, the power steering device 1 in the present embodiment is provided with a steering gear box 35 incorporating therein a rack-and-pinion type gear mechanism, in which a rack shaft (not shown) formed with a rack gear is in meshing with a pinion gear of a pinion shaft 33. This power steering device 1 is provided as hydraulic circuit components an oil pump 10 for discharging operating fluid, a power cylinder 20 for applying steering assist force to the rack shaft, and a servo valve 30 for switching the flow paths for the operating fluid between the oil pump 10 and the power cylinder 20.

Also shown in the same figure, the power steering device 1 in the present embodiment is further provided with the flow volume control valve 41 for controlling the discharge flow volume of the oil pump 10 and a pressure control valve 21 for controlling the flow volume ratio of the operating fluid, which is to be supplied to the power cylinder 20, to the discharge flow volume of the oil pump 10. Further, the power steering device 1 has the steering angle sensor 310 and a vehicle speed sensor 510 and is constituted so that the valve controlling controller 50 electronically controls the respective control valves 41 and 21 based on output signals of these sensors.

As shown in FIG. 1, the oil pump 10 is a vane type pump. A drive shaft of the pump 10 is in driving connection with an output shaft of a vehicle engine (not shown) through a pulley-belt mechanism (not shown). The power cylinder 20 is constituted to slide a piston 200 (FIG. 6) in dependence on the pressure difference between a pair of pressure chambers 231 and 232 (FIG. 6) defined at opposite ends thereof.

Further, the servo valve 30 is fit on the external surface of the pinion shaft 33 which transmits the rotation of the steering shaft 32 coupled to the steering handle 31. That is, as shown in FIG. 1, the power steering device 1 in the present embodiment controls the rotation of the servo valve 30 by the rotational torque acting on the pinion shaft 33 and properly changes over the fluid paths for the operating fluid to control the charging/discharging of the operating fluid into and from the respective pressure chambers 231, 232. The power steering device 1 is constructed so that steering assist force generated by the power cylinder 20 is applied to the rack shaft to steer steerable road wheels (not shown).

Further, as shown in FIG. 1, the power steering device 1 in the present embodiment is provided with the variable ratio transmission mechanism 7 for making the rotation transmission ratio variable between the steering handle 31 and the pinion shaft 33. As shown in FIG. 2, the variable ratio transmission mechanism 7 includes the steering shaft 32 which is composed of the first steering shaft 321 coupled to the steering handle 31 and the second steering shaft 322 coupled to the pinion shaft 33 and connects the both steering shafts 321 and 322 through a wave motion reduction gear mechanism 79.

Figure 3:
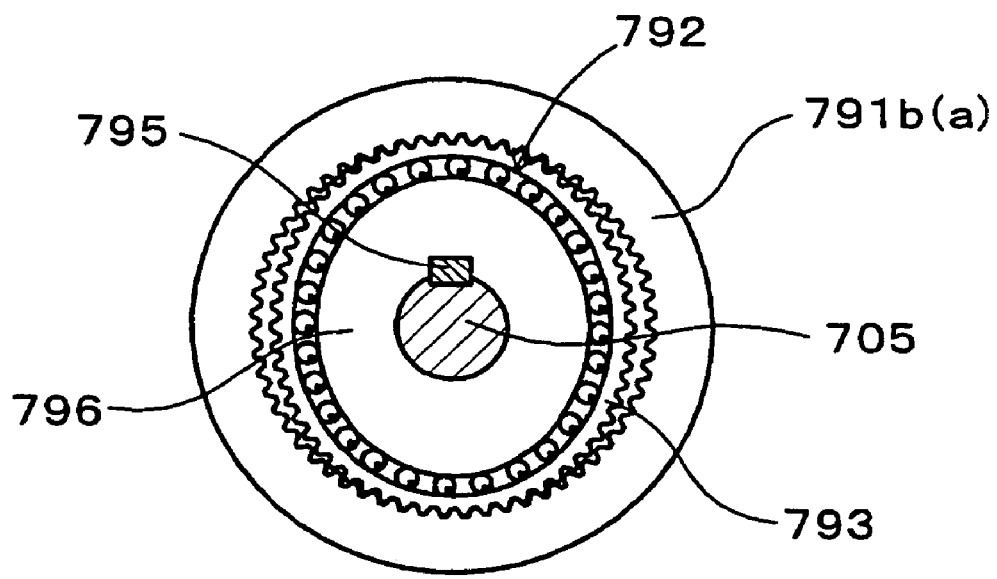
FIG. 3 is a front view showing a wave motion reduction gear mechanism in the first embodiment (a cross-section taken along the line A-A in FIG. 2)

As shown in FIG. 2, the variable ratio transmission mechanism 7 is constructed so that the rotation transmission ratio in transmitting rotational motion from the first steering shaft 321 to the second steering shaft 322 is variable by inputting the rotational operation of the drive motor 70 into the wave motion reduction gear mechanism 79. As shown in FIG. 3, the wave motion reduction gear mechanism 79 is composed of a pair of circular splines 791a and 791b, a flex spline 793 in meshing with internal surface sides of the circular spines 791a and 791b, and a wave generator 792 fitted in an internal surface side of the flex spline 793.

In the variable ratio transmission mechanism 7 in the present embodiment shown in FIGS. 2 and 3, the first steering shaft 321 is arranged to be rotatable bodily with the circular spline 791a through a housing 765. The second steering shaft 322 is arranged to be rotatable bodily with the circular spline 791b. Further, an output'shaft 705 of the drive motor 70 which is fixed to the interior of the housing 765 rotatable bodily with the first steering shaft 321 is press-fit into a cam 796 constituting the wave generator 792, together with a press-fitted key 795.

The variable ratio transmission mechanism 7 is constructed to transmit the rotation of the wave generator 792 to the circular spline 791b at a reduced speed when the wave generator 792 is rotated by the operation of the drive motor 70. In this embodiment, the transmission ratio controlling controller 60 is utilized to control the drive motor 70, so that the rotation transmission ratio of the variable ratio transmission mechanism 7 can be adjusted.

As shown also in FIG. 2, the variable ratio transmission mechanism 7 incorporates a resolver 78 therein in a juxtaposed relation to the drive motor 70 for measuring the rotational angle of the rotor 701, that is, the motor rotational angle. The resolver 78 includes a resolver rotor 781 rotatable bodily with the rotor 701 and a coil 782 secured to the internal surface of the housing 765 to be positioned around the resolver rotor 781. The resolver 78 is constructed to output induced current which is generated to vary in dependence on the rotation of the resolver rotor 781, to the transmission ratio controlling controller 60. In place of the resolver 78 in the present embodiment, there may be employed a rotational angle sensor of the type utilizing a Hall element.

Figure 4:
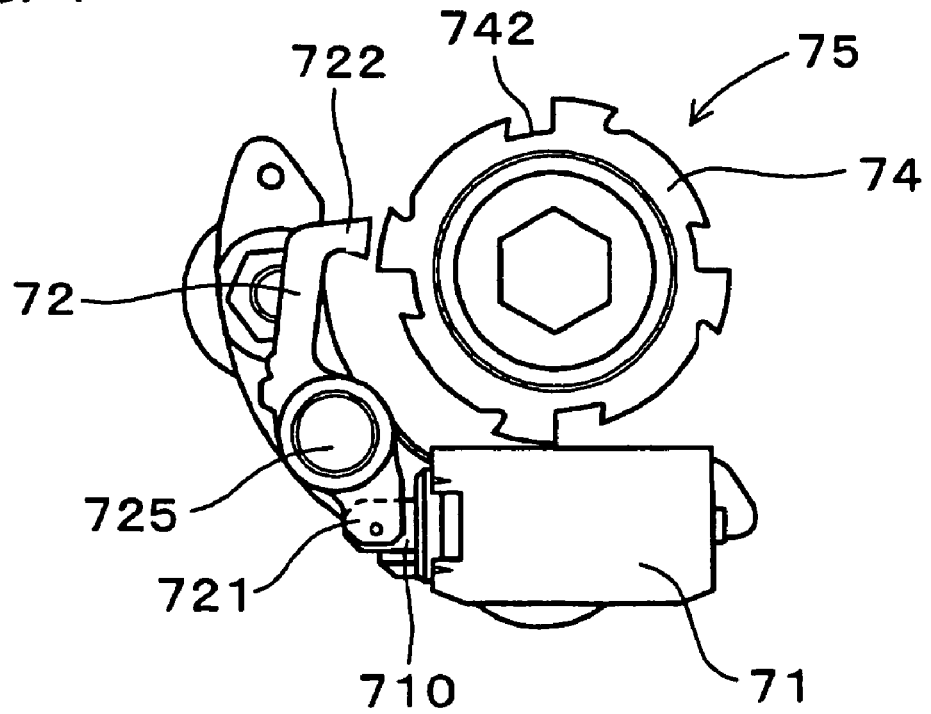
FIG. 4 is a front view showing a lock mechanism in the first embodiment (a cross-section taken along the line B-B in FIG. 2)

As shown also in FIG. 2, the variable ratio transmission mechanism 7 in the present embodiment is further provided with a lock mechanism 75 for locking or unlocking the relative rotation between the rotor 701 and the stator 702. In the lock mechanism 75, as shown in FIG. 4, a lock lever 72 pivotable about a pin shaft 725 and a lock solenoid 71 for attracting a plunger 710 are arranged at the stator 702 side of the drive motor 70. Further, a lock plate 74 is arranged at the rotor 701 side to rotate bodily with the rotor 701. An actuation portion 721 engaged with an extreme end of the plunger 710 and an engaging portion 722 engageable with the circumferential portion of the lock plate 722 are formed on the lock lever 72 at opposite ends of the same with the pin shaft 725 located therebetween. The lock plate 74 is formed with hollow portions 742 each permitting the engaging portion 722 to engage therewith.

In the lock mechanism 75, as shown in FIG. 4, urging force by means of a spring (not shown) acts on the plunger 710 in a direction opposite to the attraction force acting direction. Thus, with the lock solenoid 710 being in a de-energized state, the lock lever 72 is urged to be rotated in a clockwise direction about the pin shaft 725. This brings the engaging portion 722 of the lock lever 72 into engagement with any one of the hollow portions 742 of the lock plate 74 to lock the rotor 701 and the stator 702 against relative rotation to each other. With the drive motor 70 (FIG. 2) locked against rotation, the first steering shaft 321 is brought into direct connection with the second steering shaft 322 to set the rotation transmission ratio to be 1.

When the lock solenoid 71 is energized to attract the plunger 10, the lock lever 72 is rotated in a counterclockwise direction about the pin shaft 725 to make the engaging portion 722 depart from the circumferential portion of the lock plate 74. Therefore, in the lock mechanism 75 in the present embodiment, relative rotation is allowed between the rotor 701 (FIG. 2) and the stator 702 (FIG. 2) with the lock solenoid 71 being energized.

Figure 5:
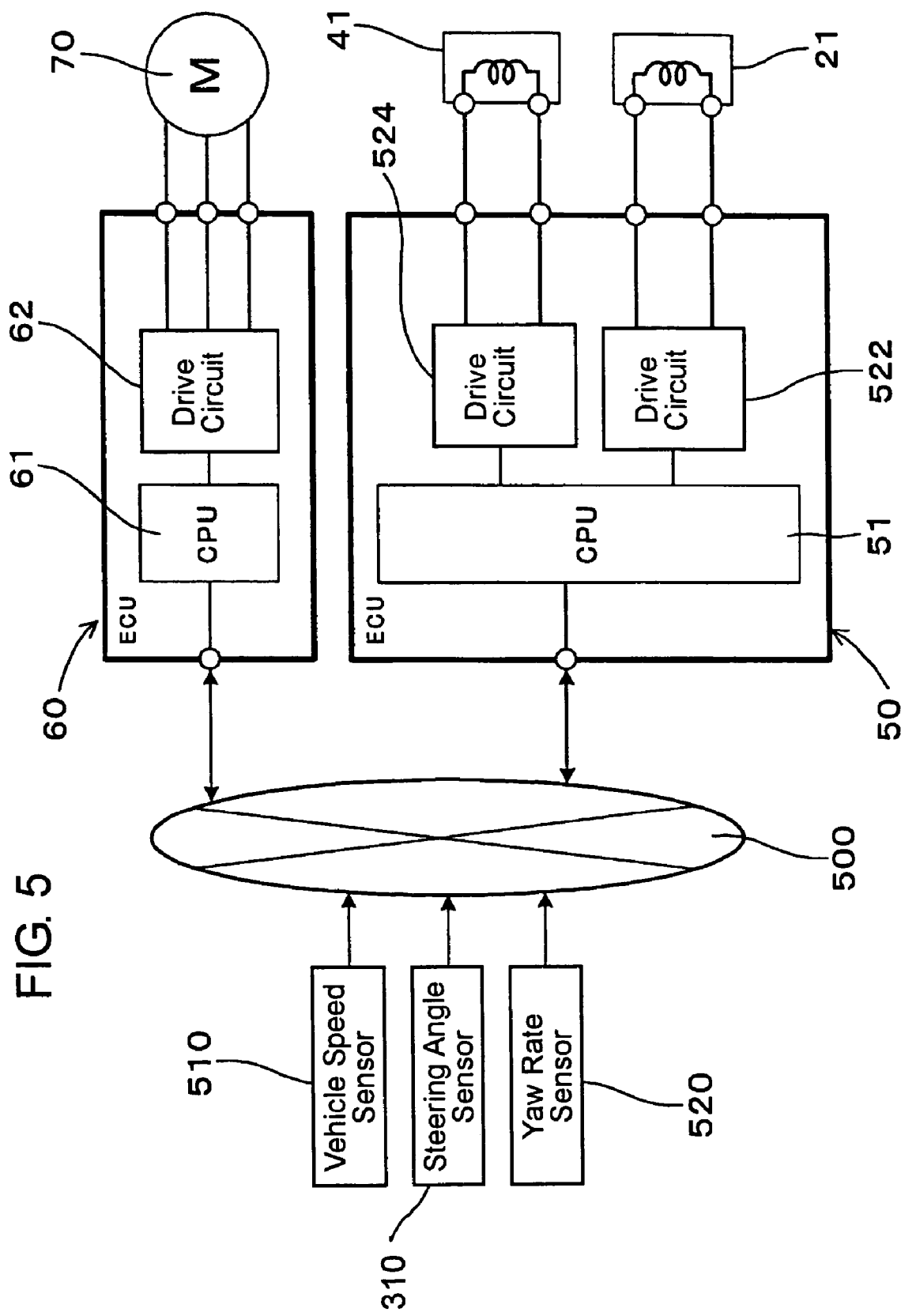
FIG. 5 is a system block diagram showing a control system of the variable gear ratio power steering device in the first embodiment.

As shown in FIG. 5, the aforementioned valve controlling controller 50 is provided with a one-chip microcomputer 51, incorporating a ROM, a RAM and a CAN interface (all not shown), and drive circuits 524 and 522 for respectively driving the control valves 41, 21 under duty control. The transmission ratio controlling controller 60 is composed of a one-chip microcomputer 61 including a ROM, a RAM and a CAN interface (all not shown) and a drive circuit 62 for driving the drive motor 70, as shown in the same figure.

In the present embodiment, as shown in FIG. 5, the valve controlling controller 50 and the transmission ratio controlling controller 60 are connected to an inter-vehicle CAN network 500 together with the vehicle speed sensor 510, the steering angle sensor 310 and a yaw rate sensor 520. The valve controlling controller 50 is constructed to take thereinto a vehicle speed and a handle steering angle transmitted from the inter-vehicle CAN network 500 and to perform the duty control of the control valves 41, 21 based on these input values. In the present embodiment, the duty control under which cyclic pulse-like voltage is applied to a solenoid 419 is carried out to continuously control the valve opening of each of the control valves 41, 21.

The transmission ratio controlling controller 60 is constructed to take thereinto the vehicle speed, the handle steering angle and a measured yaw rate and to calculate the handle angular velocity by differentiating the handle steering angle with respect to time. It is also constructed to control the drive motor 70 based on the vehicle speed, the handle steering angle, the handle angular velocity and the measured yaw rate.

The handle angular velocity calculated by being time-differentiated is likely to involve noises, errors and the like. For this reason, in the present embodiment, a threshold value is provided for the handle angular velocity, and the control operation is carried out while regarding as zero the handle angular velocity lower than the threshold value.

Further, the transmission ratio controlling controller 60 is constructed to sample the induced current like a sin wave input from the resolver 78 and to calculate the measured ACT angle which is the motor rotational angle of the drive motor 70. Then, the transmission ratio controlling controller 60 in the present embodiment executes the control of the drive motor 70 to make the measured ACT angle reach a control target value. In addition, the transmission ratio controlling controller 60 in the present embodiment is constructed to transmit the measured ACT angle to the valve controlling controller 50 by way of the inter-vehicle CAN network 500 and to be capable of transmitting and receiving control signals between the valve controlling controller 50 and itself.

The steering angle sensor 310 is constructed to detect the handle steering angle based on the signal output from a rotary encoder (not shown) coupled to the steering shaft 32. Further, the vehicle speed sensor 510 utilizes a tachometer arranged on an output shaft of a transmission (not shown) and is constructed to detect the vehicle speed from the frequency of a pulse train signal generated by the tachometer.

Figure 6:
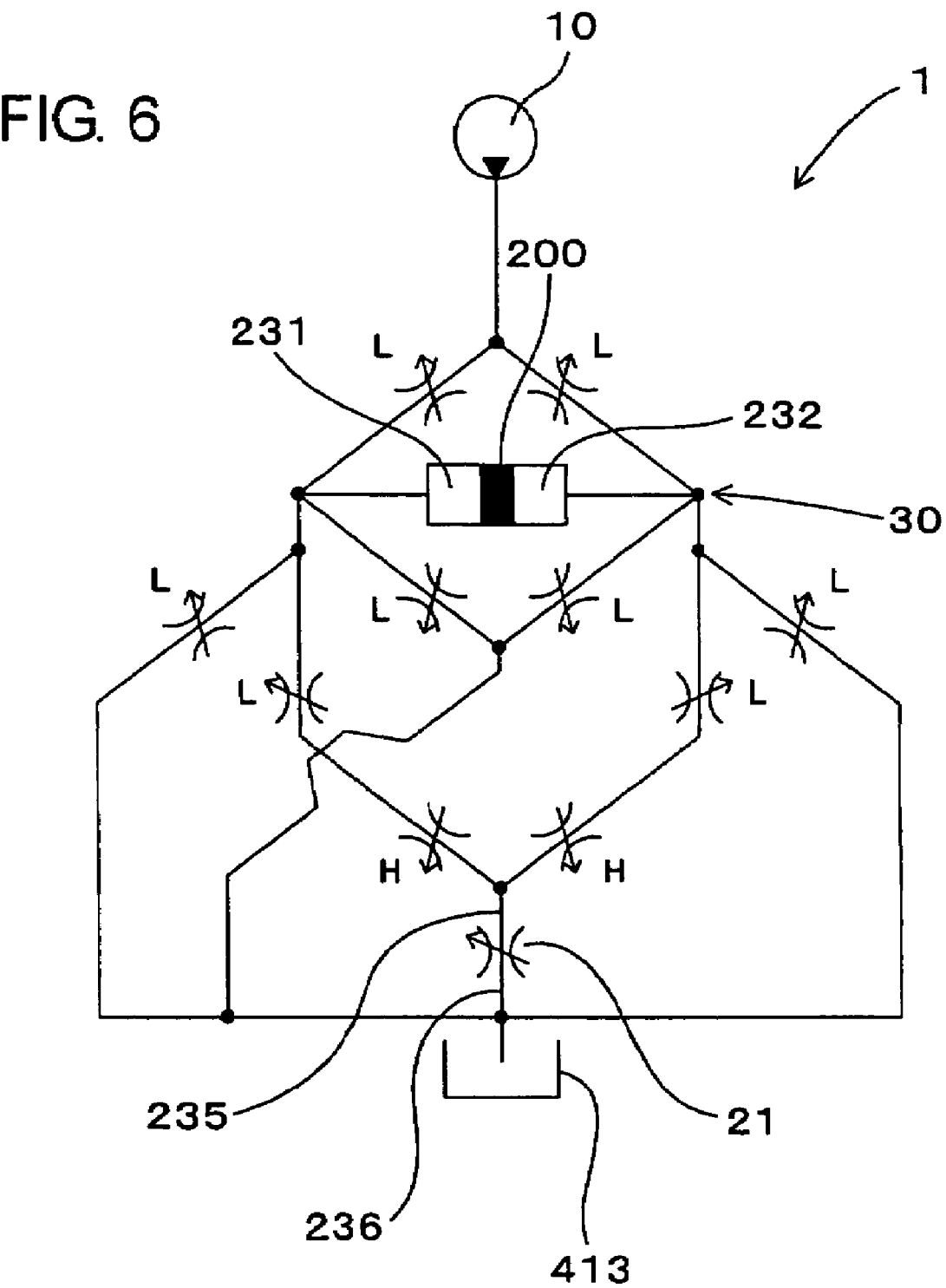
FIG. 6 is a hydraulic circuit diagram showing a hydraulic circuit of the variable gear ratio power steering device in the first embodiment.

Also in the power steering device 1 in the present embodiment, a hydraulic circuit therefor is constructed as shown in FIG. 6. Represented in the form of ten (10) throttles in this figure is the aforementioned servo valve 30 in the present embodiment, which is provided with eight (8) low speed throttles (indicated at "L" in the figure) and two (2) high speed throttles (indicated at "H" in the figure). In the hydraulic circuit, the operating fluid discharged from the oil pump 10 is distributed to the pressure chambers 231 and 232 of the power cylinder 20 by way of the low speed throttles and is flown into a reservoir tank 413 by way of the high speed throttles and the pressure control valve 21 which are on circuit paths branched from the pressure chambers 231, 232.

In the hydraulic circuit, as shown in FIG. 6, a hydraulic path communicating with the reservoir tank 413 is provided with the pressure control valve 21 thereon and is connected to hydraulic paths for supplying the operating fluid from the oil pump 10 to the pressure chambers 231, 232 of the power cylinder 20. That is, the pressure control valve 21 is arranged to control the opening degree between a communication path 235 communicating with the pressure chambers 231, 232 and another communication path 236 communicating with the reservoir tank 413. Thus, the pressure control valve 21 in the present embodiment regulates the pressure in the pressure chamber 231 (or 232) by draining to the reservoir tank 413 a part of the operating fluid supplied from the oil pump 10 toward the pressure chamber 231 (or 232).

Figure 7:
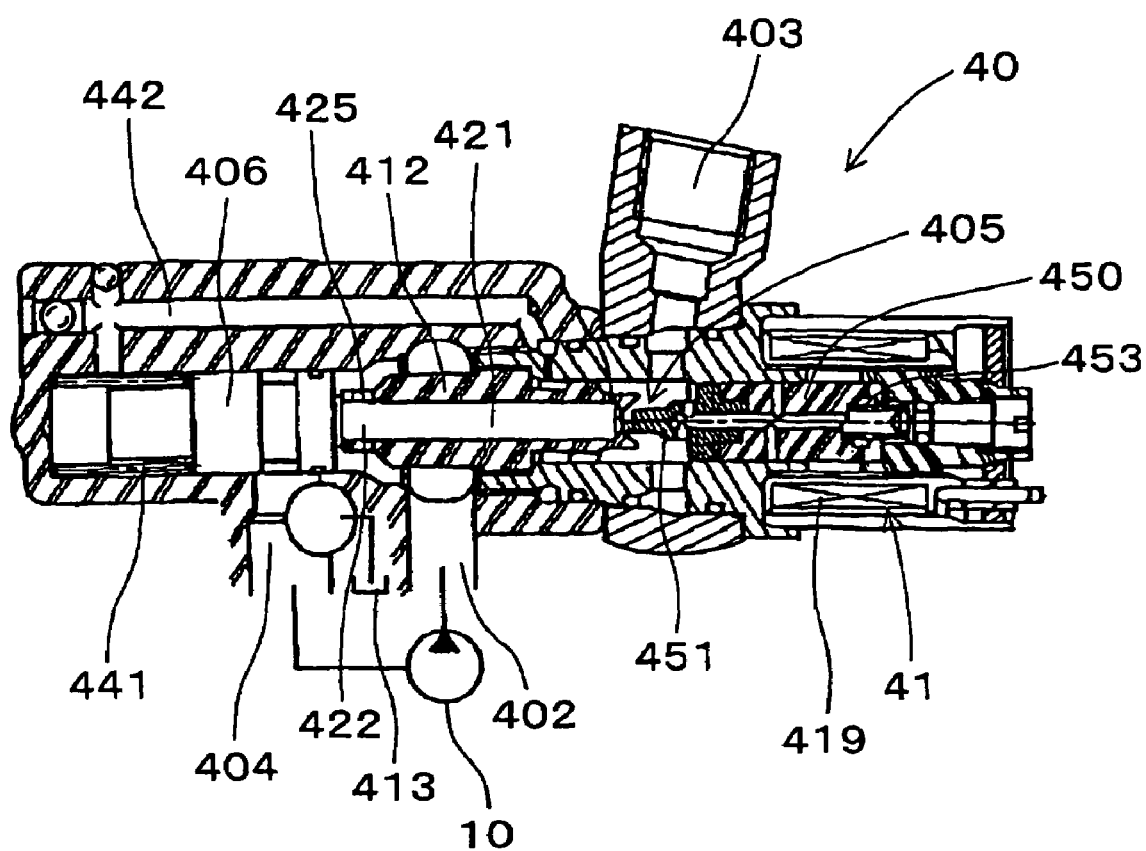
FIG. 7 is a sectional view showing the sectional structure of a flow volume control valve in the first embodiment.
Figure 8:
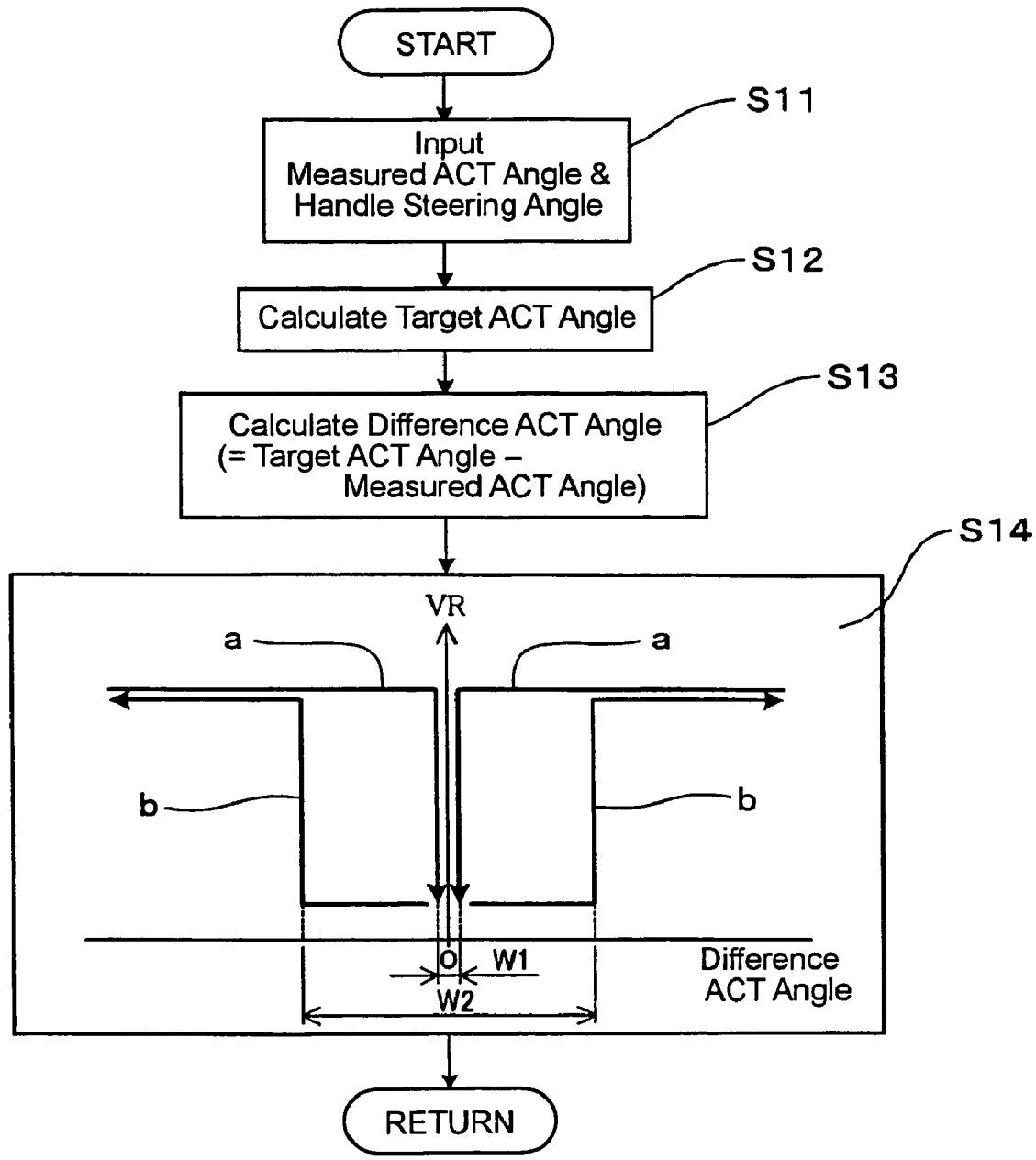
FIG. 8 is a control flow chart showing procedural steps executed by a valve controlling controller in the first embodiment.

The oil pump 10 in the present embodiment incorporates therein a flow volume control mechanism 40 which is a mechanism for controlling the discharge flow volume of the oil pump 10 and which is composed primarily of the flow volume control valve 41 including the aforementioned solenoid valve 41, as shown in FIG. 7. The flow volume control mechanism 40 is constructed to receive from an inlet port 402 the operating fluid discharged from the oil pump 10, to drain a part of the operating fluid to a return path 404 by the action of a spool valve member 406, and to supply the remaining part of the operating fluid from an outlet port 403 toward the servo valve 30. In the return path 404, there is opened a communication path which opens into the operating fluid contained in the reservoir tank 413.

As shown also in the same figure, the flow volume control mechanism 40 has incorporated therein the flow volume control valve 41 which is composed of a throttle member 412 with an axial through hole 421, the spool valve member 406 urged toward the throttle member 412, and a plunger 450 having a valve element 451 formed bodily.

The throttle member 412 has an open port 422 allowing the through hole 421 to open, at an end portion thereof on the side of the spool valve member 406 and a variable throttle 405 cooperating with the valve element 451, at the other end portion thereof on the side of the valve element 451. A communication hole 425 for leading the operating fluid flown from the inlet port 402 into the through hole 421 is formed at a body portion adjacent to the open port 422 of the throttle member 412. Further, the spool valve member 406 is urged by means of a spring 441 and is in contact with the end portion of the throttle member 412 when at an ordinary home position. The spool valve member 406 blocks the communication of the open port 422 with the return path 404 when at the home position where it contacts with the throttle member 412, but allows the open port 422 to communicate with the return path 404 when displaced against the spring 441.

As shown in FIG. 7, a pressure of the fluid past the variable throttle 405 acts on an end portion on the spring 441 side of the spool valve member 406 through a pressure path 442. Further, a pressure of the fluid toward the variable throttle 405 acts on the opposite end portion of the spool valve member 406. Thus, the spool valve member 406 is operated in dependence on the pressure difference across the variable throttle 405.

When an increase in the flow volume from the oil pump 10 causes the pressure difference across the variable throttle 405 to become equal to or greater than a predetermined value, the spool valve member 406 is displaced by the pressure difference between the both sides thereof to depart from the throttle member 412. This brings the inlet port 402 and the return path 404 into communication to increase the flow volume of that part returned toward the oil pump 10 of the operating fluid flown from the inlet port 402. By increasing the flow volume to be returned in this way, the flow volume control mechanism 40 in the present embodiment keeps the flow volume discharged from the outlet port 403 approximately constant regardless of the increase in the flow volume from the oil pump 10. Further, in the flow volume control mechanism 40, the aforementioned approximately constant flow volume discharged from the outlet port 403 is varied in dependence on the opening degree of the variable throttle 405.

The opening degree of the variable throttle 405 is controlled by the flow volume control valve 41 constituted by a solenoid valve, as shown in FIG. 7. This flow volume control valve 41 is composed of a plunger 450, a solenoid 419 for attracting the plunger 450, and a spring 453 applying urging force toward the side of the valve element 451 on the plunger 450. With the solenoid 419 energized, the plunger 450 and the valve element 451 are attracted with the result that the valve element 45 departs from the throttle member 412 to open the variable throttle 405. With the solenoid 419 de-energized, on the other hand, the valve element 451 comes into contact with the throttle member 412 to close the variable throttle 405.

Accordingly, in the flow control mechanism 40, as shown in the same figure, when the variable throttle 405 is closed by the de-energization of the flow volume control valve 41, the pressure difference across the variable throttle 405 tends to be produced, and the flow volume discharged from the outlet port 403 is decreased. When the flow volume control valve 41 is energized, on the contrary, the variable throttle 405 is opened to suppress the pressure difference across the variable throttle 405, and the flow volume discharged from the outlet port 403 is increased. In substitution for the flow volume control valve 41 constituted by the solenoid valve in the present embodiment, it is possible to use a control valve which is constructed to be capable of varying the valve opening degree by a stepping motor, for example.

Next, description will be made as to a method of controlling the variable gear ratio power steering device 1 in the present embodiment as constructed above, and in particular, as to a method of controlling the flow volume control valve 41. Herein, procedural steps executed by the valve controlling controller 50 will be described with reference to FIG. 8.

At step S11, there are taken in the handle steering angle and the measured ACT angle which has been calculated by the transmission ratio controlling controller 60 in the manner as aforementioned. Then, at step S12, a target ACT angle is calculated by multiplying the handle steering angle with the rotation transmission ratio of the variable ratio transmission mechanism 7. In this case, the rotation transmission ratio can be calculated based on information such as the vehicle speed value, the handle steering angle and so forth.

At step S13, a difference ACT angle is calculated by subtracting the measured ACT angle from the target ACT angle. At step S14, the valve opening degree VR of the flow volume control valve 41 is controlled in dependence on the difference ACT angle, and a switching is made between a standby state (the state wherein the steering assist is insufficient) and an assist state (the state wherein the steering assist is being performed) of the hydraulic circuit. Herein, the "assist state" means the state in which the discharge flow volume of the oil pump 10 is increased with the flow volume control valve 41 made to be large, in its valve opening degree VR, while the "standby state" means the state in which the discharge flow volume is decreased with the flow volume control valve 41 made to be small in its valve opening degree VR.

More specifically, the valve opening degree of the flow volume control valve 41 is controlled at step S14 as follows. The transition from the assist state to the standby state is made when the absolute value of the difference ACT angle which was out of a range W1 in the beginning is decreased gradually to come into the range W1, as indicated by the solid line (a). The transition from the standby state to the assist state is made when the absolute value of the difference ACT angle which was within another range W2 in the beginning is increased gradually to go out the range W2, as indicated by the solid line (b). In this particular embodiment, the range W2 is provided to encompass the range W1 in order to realize hysteresis in control.

As described above, in the variable gear ratio power steering device 1 in the present embodiment, the valve controlling controller 50 is constructed to calculate the target ACT angle based on the handle steering angle and the rotation transmission ratio and then to calculate the difference ACT angle which is the difference between the target ACT angle and the measured ACT angle. The valve controlling controller 50 is further constructed to then control the flow volume control valve 41 so that the discharge flow volume of the oil pump 10 becomes equal to or greater than the predetermined flow volume when the difference ACT angle is equal to the threshold value or larger.

Therefore, in the variable gear ratio power steering device 1 in the present embodiment, it can be realized to steer the steerable road wheels early (i.e., without delay) even when the steering handle 31 is manipulated slowly with the handle angular velocity remaining in a range which does not reach the threshold value. The reason is as follows. That is, in this case, the difference ACT angle is increased as the handle steering angle is increased, and hence, according to the variable gear ratio power steering device 1 in the present embodiment, the discharge flow volume of the oil pump 10 is increased when the difference ACT angle reaches the threshold value or larger.

Therefore, the variable gear ratio power steering device 1 is early in the timing when the steerable road wheels are moved in response to the manipulation of the steering handle 31 and excels in the handle steering feeling.

Second Embodiment

The present embodiment is an example which is built on the variable gear ratio power steering device 1 in the first embodiment and which controls the flow volume control valve 41 in dependence on the yaw rate of the vehicle. The details of this embodiment will be described with reference to FIGS. 1, 5 and 9.

As shown in FIGS. 1 and 5, the variable gear ratio power steering device 1 in the present embodiment is provided with the vehicle speed sensor 510 for measuring the vehicle speed which is the speed of the vehicle, and a yaw rate sensor 520 for measuring a measured yaw rate which is the turn speed of the vehicle. The valve controlling controller 50 is constructed to take therein the measured yaw rate, the vehicle speed and the handle steering angle and to calculate an estimated or inferred yaw rate based on the vehicle speed and the handle steering angle. Further, the valve controlling controller 50 is constructed to execute a control under which the flow volume control valve 41 increases the discharge flow volume in dependence on the magnitude of a difference yaw rate which is the difference between the inferred yaw rate and the measured yaw rate.

The transmission ratio controlling controller 60 in the present embodiment stores in the ROM a motion model expression representing a vehicle motion model which correlates the vehicle speed, the handle steering angle and the yaw rate with one another. Thus, the transmission ratio controlling controller 60 is constructed to be able to calculate the inferred yaw rate which may have been generated, by substituting the vehicle speed and the handle steering angle into the vehicle motion model. Further, the transmission ratio controlling controller 60 is constructed to take therein the measured yaw rate from the yaw rate sensor 520 and to calculate the difference yaw rate which is the absolute value of the difference between the measured yaw rate and the inferred yaw rate.

Figure 9:
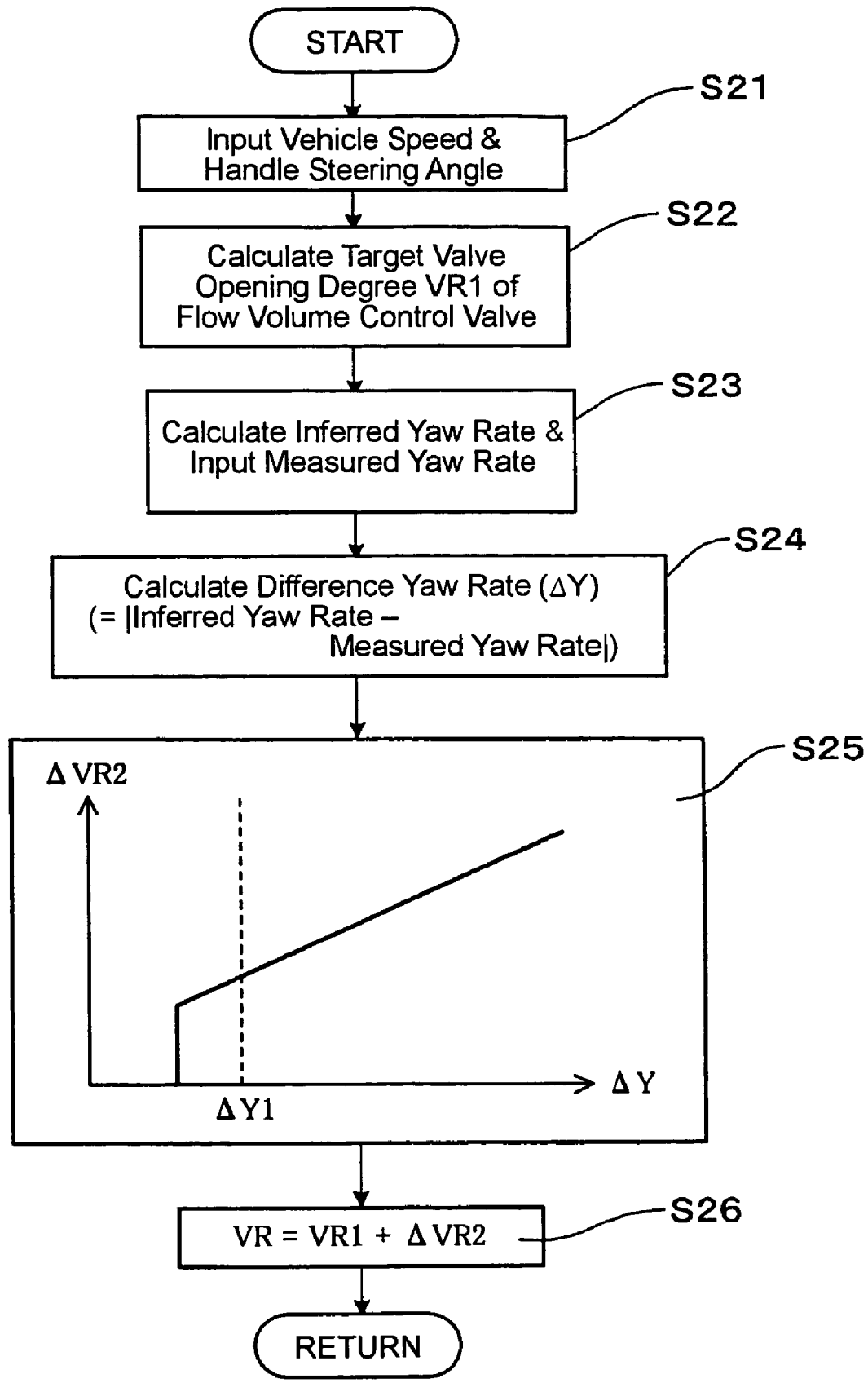
FIG. 9 is a control flow chart showing procedural steps executed by the valve controlling controller in a second embodiment.

Next, description will be made as to a method of controlling the variable gear ratio power steering device 1 in the present embodiment as constructed above, and in particular, as to a method of controlling the flow volume control valve 41. In the present embodiment, as procedural steps for the valve controlling controller 50, procedural steps shown in FIG. 9 are executed in addition to the those steps (FIG. 8) described in the first embodiment.

First of all, at step S21, there are taken in the vehicle speed and the handle steering angle. Then, at step S22, a target valve opening degree VR1 of the flow volume control valve 41 is calculated based on the vehicle speed and the handle steering angle.

Then, at step S23, the measured yaw rate of the yaw rate sensor 520 is taken in, and an inferred yaw rate is calculated by substituting the vehicle speed and the handle steering angle into the vehicle motion model expression as described above. Then, at step S24, a calculation is made for a difference yaw rate $\Delta Y$ which is the absolute value of the difference between the inferred yaw rate and the measured yaw rate.

Then, at step S25, a compensation amount $\Delta VR2$ for the valve opening degree of the flow volume control valve 41 is calculated in dependence on the difference yaw rate. In the present embodiment, a compensation map is prepared in advance to provide the relation between the difference yaw rate $\Delta Y$ and the compensation amount $\Delta VR2$, and the compensation amount $\Delta VR2$ is obtained by reference to this map.

Subsequently, at step S26, the target valve opening VR1 calculated at step S22 and the compensation amount $\Delta VR2$ are added to calculate a target valve opening degree VR for the flow volume control valve 41.

A symbol $\Delta Y1$ in the compensation map illustrated at step S25 designates a threshold value from which the variable ratio transmission mechanism 7 initiates a yaw rate control for decreasing the yaw rate. In the compensation map in the present embodiment, the compensation amount $\Delta VR2$ is provided from a range in which the difference yaw rate $\Delta Y$ is smaller than the threshold value $\Delta Y1$. Thus, in the variable gear ratio power steering device 1 in the present embodiment, it can be realized to increase the discharge flow volume of the oil pump 10 before the variable ratio transmission mechanism 7 initiates the yaw rate control.

Accordingly, the variable gear ratio power steering device 1 in the present embodiment is excel in a controllability that can suppress the tendency for the oil pump 10 to run short of the discharge flow volume during the yaw rate control by the variable ratio transmission mechanism 7.

Other constructions, operations and effects of the present embodiment are the same as those of the first embodiment.

Embodiment 3

The present embodiment is an example which is built on the variable gear ratio power steering device 1 in the first embodiment or the second embodiment and which controls the flow volume control valve 41 in dependence on the rotational angular velocity of the pinion shaft 33. The details of this embodiment will be described with reference to FIGS. 1, 5 and 10.

As shown in FIGS. 1 and 5, the variable ratio transmission mechanism 7 in the present embodiment is provided with the drive motor 70 having the rotor 701 and the stator 702 combined, and the rotational angular sensor 78 for measuring the measured ACT angle which is the motor rotational angle of the drive motor 70, and is constructed to alter the rotation transmission ratio between the steering shafts 321 and 322 in dependence on the rotational operation of the drive motor 70.

The valve controlling controller 50 is constructed to take therein the measured ACT angle and the handle steering angle and to calculate the handle angular velocity from the handle steering angle. Further, the valve controlling controller 50 is constructed to calculate a pinion angular velocity which is the rotation angular velocity of the pinion shaft 33, based on the rotation transmission ratio of the variable ratio transmission mechanism 7 calculated from the measured ACT angle, and also based on the handle angular velocity. Further, the valve controlling controller 50 is constructed to perform a control under which the flow volume control valve 41 increases the discharge flow volume of the oil pump 10 in dependence upon the magnitude of the pinion angular velocity.

Figure 10:
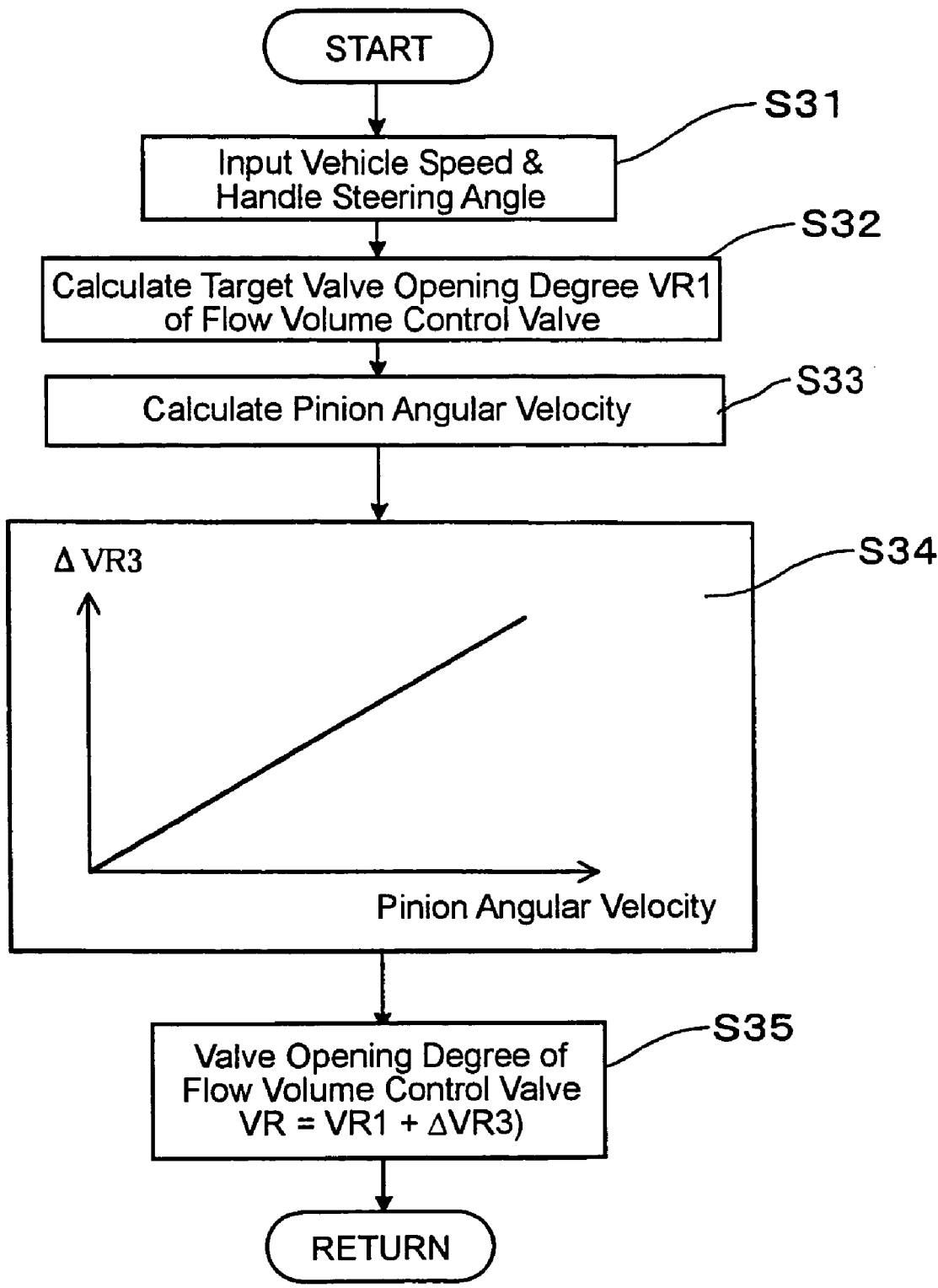
FIG. 10 is a control flow chart showing procedural steps executed by the valve controlling controller in a third embodiment.

Next, description will be made as to a method of controlling the variable gear ratio power steering device 1 in the present embodiment as constructed above, and in particular, as to a method of controlling the flow volume control valve 41. In the present embodiment, as procedural steps for the valve controlling controller 50, procedural steps shown in FIG. 10 are executed in addition to those steps (FIGS. 8 and 9) described in the first embodiment and the second embodiment.

First of all, the vehicle speed and the handle steering angle are taken in at step S31. Then, at step S32, a target valve opening degree VR1 of the flow volume control valve 41 is calculated based on the vehicle speed and the handle steering angle.

Then, at step S33, a handle angular velocity is calculated by differentiating the handle steering angle with respect to time, and a pinion angular velocity of the pinion shaft 33 is calculated by multiplying the handle angular velocity with the transmission ratio of the variable ratio transmission mechanism 7.

Thereafter, at step S34, a compensation amount $\Delta VR3$ for the valve opening degree of the flow volume control valve 41 is calculated in dependence on the pinion angular velocity. In the present embodiment, a compensation map is prepared in advance to provide the relation between the pinion angular velocity and the compensation amount $\Delta VR3$, and the compensation amount $\Delta VR3$ is obtained by reference to this map.

Subsequently, at step S35, the target valve opening degree VR1 calculated at step S32 and the compensation amount $\Delta VR3$ are added to calculate a target valve opening degree VR for the flow volume control valve 41.

Where the present embodiment is combined to incorporate the control executed in the second embodiment, the target valve opening degree VR can be calculated by the sum of the target valve opening degree VR1, the compensation amount ΔVR2 in the second embodiment, and the compensation amount ΔVR3 in the present embodiment.

According to the variable gear ratio power steering device 1 in the present embodiment, it can be realized to control the discharge flow volume of the oil pump 10 properly in dependence on the pinion angular velocity without providing any additional sensor for detecting the rotational angle of the pinion shaft 33. Thus, in the variable gear ratio power steering device 1 in the present embodiment, the discharge flow volume can be kept properly in dependence on the operating state of the variable ratio transmission mechanism 7.

Accordingly, in the variable gear ratio power steering device 1 in the present embodiment, it hardly occurs that the oil pump 10 runs short of the discharge flow volume regardless of the operational state of the variable ratio transmission mechanism 7.

Other constructions, operations and effects of the present embodiment are the same as those of the first embodiment or the second embodiment.

Various features and many of the attendant advantages in the foregoing embodiments will be summarized as follows:

In the variable gear ratio power steering device 1 in the first embodiment typically shown in FIGS. 1, 2, 5 and 8, the transmission ratio controlling controller 60 is constructed to control the variable ratio transmission mechanism 7 by regulating the magnitude of supply electric power to the drive motor 70 in dependence on at least the handle steering angle and the handle angular velocity.

Under the aforementioned control of the transmission ratio controlling controller 60, it may be the case that a threshold value is set for the handle angular velocity in order to preclude erroneous operation caused by, for example, errors, noises or the like. Thus, when the steering handle 31 is manipulated at a slower handle angular velocity than the threshold value, for example, there occurs a situation that the variable ratio transmission mechanism 7 is controlled in dependence upon the handle steering angle only. In this situation, as the handle steering angle is increased, the supply electric power to the drive motor 70 is increased. Then, steerable road wheels begin to be steered for the first time when a resultant force from the output power of the drive motor 70 and the assist force generated by the variable gear ratio hydraulic power steering device 1 exceeds a force required to operate the steerable road wheels.

On the other hand, in the power steering device 1 in the first embodiment, the valve controlling controller 50 obtains the target ACT angle based on the handle steering angle and calculates the difference ACT angle which is the difference between the target ACT angle and the measured ACT angle. And, the valve controlling controller 50 is constructed to control the flow volume control valve 41 so that the discharge flow volume is made to be equal to or greater than the predetermined flow volume when the difference ACT angle is equal to or greater than the threshold value.

Thus, in the variable gear ratio power steering device 1 according to the first embodiment, the difference ACT angle increases as the handle steering angle is increased, and when the difference ACT angle becomes equal to or greater than the threshold value, the discharge flow volume of the oil pump 10 can be increased, whereby the variable gear ratio power steering device 1 is enabled to responsively gain the steering assist force which it can generate.

Therefore, in the variable gear ratio power steering device 1, the discharge flow volume is increased with the operation of the variable ratio transmission mechanism 7. Thus, the resultant force from the output power of the drive motor 70 and the steering assist force can be gained immediately without causing the oil pump 10 to run short of the discharge flow volume, so that it can be realized to make earlier the timing when the steerable road wheels begin to move.

As described above, the variable gear ratio power steering device 1 according to the first embodiment is early in the timing when the steerable road wheels begin to be steered and can be improved in the handle steering feeling.

In the first embodiment, the target ACT angle may be calculated by, for example, multiplying the handle steering angle with the rotation transmission ratio of the variable ratio transmission mechanism 7.

The variable gear ratio power steering device 1 in the second embodiment typically shown in FIGS. 1, 5 and 9 is provided with the vehicle speed sensor 510 for measuring the vehicle speed and the yaw rate sensor 520 for measuring the yaw rate.

And, the valve controlling controller 50 is constructed to take thereinto the measured yaw rate, the vehicle speed and the handle steering angle and to calculate the inferred yaw rate based on the vehicle speed and the handle steering angle. Further, the valve controlling controller 50 is constructed to control the flow volume control valve 41 so that the discharge flow volume of the oil pump 10 is increased in dependence on the magnitude of the difference yaw rate ΔY which is the difference between the inferred yaw rate and the measured yaw rate.

The case where the difference yaw rate ΔY which is the difference between the inferred yaw rate and the measured yaw rate becomes large may take place for example as the case where rear wheels of the vehicle fall in a spinning state in which they slip by loosing the grip on the road surface. Especially, where the vehicle falls in the spinning state for some reason during the traveling on a straight road, it is highly probable that in that event, the driver performs a rapid handle manipulation such as counter steering or the like.

However, the valve controlling controller 50 in the second embodiment is constructed to control the flow volume control valve 41 so that the discharge flow volume of the oil pump 10 is increased in dependence on the magnitude of the difference yaw rate ΔY.

Thus, in the variable gear ratio power steering device 1 in the second embodiment, it can be realized to increase the discharge flow volume of the oil pump 10 at the same time as the vehicle transits from a straight traveling state to the spinning state. Therefore, prior to the counter steering or the like performed by the driver, the discharge flow volume of the oil pump 10 is increased to become ready for the driver's steering manipulation which will occur subsequently.

Accordingly, the variable gear ratio power steering device 1 in the second embodiment is advantageous in that it is highly responsive in transmitting the driver's steering manipulation accurately to the steerable road wheels even when for example, the loss by the vehicle of gripping the road surface causes the yaw rate to vary sharply.

In the variable gear ratio power steering device 1 in the third embodiment typically shown in FIGS. 1, 5 and 10, the valve controlling controller 50 is constructed to take therein the measured ACT angle and the handle steering angle, to calculate the handle angular velocity and the rotation transmission ratio of the variable ratio transmission mechanism 7 and further to calculate the pinion angular velocity by multiplying the handle angular velocity with the rotation transmission ratio. And the valve controlling controller 50 is constructed to execute the control under which the flow volume control valve 41 increases the discharge flow volume.

Therefore, in the variable gear ratio power steering device 1, it is unnecessary to additionally provide any measuring sensor or the like for measuring the rotational angle of the pinion shaft 33. This is because in the variable gear ratio power steering device 1, the pinion angular velocity can be calculated precisely by utilizing measured values of the steering angle sensor 310 and the rotational angular sensor 78. And, since the discharge flow volume of the oil pump 10 is increased in dependence on the magnitude of the pinion angular velocity, it can be realized to accurately control the discharge flow volume of the oil pump 10 in the variable gear ratio power steering device 1 including the variable ratio transmission mechanism 7.

Modifications or Further Preferred Embodiments

In the second embodiment, it is preferable that the transmission ratio controlling controller 60 is constructed to obtain the difference yaw rate ΔY and to rotate the second steering shaft 322 by the use of the variable ratio transmission mechanism 7 so that the difference yaw rate ΔY approaches to zero.

For example, where in the spinning state, the variable ratio transmission mechanism 7 is controlled to make the difference yaw rate ΔY approach to zero just as the counter steering is performed, it may be the case that the variable ratio transmission mechanism 7 rotates the pinion shaft 33 irrespective of the manipulation of the steering handle 31. In this respect, the effect of the second embodiment is particularly effective wherein the flow volume control valve 41 is controlled to increase the discharge flow volume in dependence on the difference yaw rate ΔY.

The method in which the transmission ratio controlling controller 60 obtains the difference yaw rate ΔY may for example be a method of taking in the difference yaw rate ΔY calculated by the valve controlling controller 50, another method of calculating the inferred yaw rate independently and then of calculating the difference yaw rate ΔY as the difference value from the measured yaw rate, or the like.

Further, it is preferable that the variable ratio transmission mechanism 7 is provided with the drive motor 70 having the rotor 701 and the stator 702 combined and the rotational angular sensor 78 for measuring the measured ACT angle which is the motor rotational angle of the drive motor 70, and is constructed to alter the rotation transmission ratio between the first and second steering shafts 321, 322 in dependence on the rotational operation of the drive motor 70, that the valve controlling controller 50 is constructed to take thereinto the measured ACT angle and the handle steering angle and to calculate the handle angular velocity and the rotation transmission ratio for the variable ratio transmission mechanism 7 based on the handle steering angle and the measured ACT angle, and that the valve controlling controller 50 is constructed to calculate the pinion angular velocity which is the rotational angular velocity of the pinion shaft 33, by multiplying the rotation transmission ratio with the handle angular velocity and to execute the control under which the flow volume control valve 41 increases the discharge flow volume in dependence on the magnitude of the pinion angular velocity.

In this preferred form, the valve controlling controller 50 is constructed to take thereinto the measured ACT angle and the handle steering angle and to calculate the pinion angular velocity based on the handle angular velocity which is calculated from the handle steering angle, and the rotation transmission ratio of the variable ratio transmission mechanism 7 which is calculated based on the measured ACT angle. The valve controlling controller 50 is constructed to execute the control under which the flow volume control valve-41 increases the discharge flow volume in dependence on the magnitude of the pinion angular velocity.

Thus, in the variable gear ratio power steering device 1, it is unnecessary to additionally provide any measuring sensor for measuring the rotational angle of the pinion shaft 33. This is because in the variable gear ratio power steering device 1, the pinion angular velocity can be calculated by utilizing the respective measuring values from the steering angle sensor 310 and the rotational angle sensor 78. And, where the discharge flow volume of the oil pump 10 is increased in dependence on the magnitude of the pinion angular velocity, it can be realized to control the discharge flow volume of the oil pump 10 accurately in the variable gear ratio power steering device 1 including the variable ratio transmission mechanism 7.

Further, it is preferable that the power steering device 1 is provided with the vehicle speed sensor 510 for measuring the vehicle speed which is the speed of the vehicle, and the yaw rate sensor 520 for measuring the measured yaw rate which is the turn speed of-the vehicle, that the valve controlling controller 50 is constructed to take thereinto the measured yaw rate, the vehicle speed and the handle steering angle and to calculate the inferred yaw rate which is estimated, based on the vehicle speed and the handle steering angle, and that the valve controlling controller 50 is further constructed to execute the control under which the flow volume control valve 41 increases the discharge flow volume in dependence on the magnitude of the difference yaw rate ΔY which is the difference between the inferred yaw rate and the measured yaw rate.

In this preferred form, the variable gear ratio power steering device 1 is provided with the vehicle speed sensor 510 for measuring the vehicle speed and the yaw rate sensor 520 for measuring the measured yaw rate. And, the valve controlling controller 50 is constructed to take thereinto the measured yaw rate, the vehicle speed and the handle steering angle and to calculate the inferred yaw rate based on the vehicle speed and the handle steering angle. Further, the valve controlling controller 50 is constructed to control the flow volume control valve 41 so that the discharge flow volume of the oil pump 10 is increased in dependence on the magnitude of the difference yaw rate ΔY which is the difference between the inferred yaw rate and the measured yaw rate.

The case that the difference yaw rate ΔY which is the difference between the inferred yaw rate and the measured yaw rate becomes large may for example be the case wherein the rear wheels of the vehicle fall in the spinning state in which they slip by loosing the grip on the road surface. Especially, where the vehicle falls in the spinning state for some reason during the traveling on the straight road, it is highly probable that in that event, the driver performs a quick handling manipulation such as counter steering or the like.

However, the valve controlling controller 50 in the second embodiment is constructed to control the flow volume control valve 41 so that the discharge flow volume of the oil pump 10 is increased in dependence on the magnitude of the difference yaw rate ΔY.

Thus, in the variable gear ratio power steering device 1 in the second embodiment, it can be realized to increase the discharge flow volume of the oil pump 10 at the same time as the vehicle transits from a straight traveling state to the spinning state. Therefore, prior to the counter steering or the like performed by the driver, the discharge flow volume of the oil pump 10 is increased to become ready for the driver's steering manipulation which will occur subsequently.

Accordingly, the variable gear ratio power steering device 1 in the second embodiment is advantageous in that it is highly responsive in transmitting the driver's steering manipulation accurately to the steerable road wheels even when for example, the yaw rate varies sharply due to loss of gripping the road surface of the vehicle.

Further, it is preferable that the transmission ratio controlling controller 60 obtains the difference yaw rate $\Delta Y$ and rotates the second steering shaft 322 by the use of the variable ratio transmission mechanism 7 so that the difference yaw rate $\Delta Y$ approaches to zero.

For example, where in the spinning state, the variable ratio transmission mechanism 7 is controlled to make the difference yaw rate $\Delta Y$ approach to zero just as the counter steering is performed, it may be the case that the variable ratio transmission mechanism 7 rotates the pinion shaft 33 irrespective of the manipulation of the steering handle 31. In this respect, the effect of the second embodiment is particularly effective wherein the flow volume control valve 41 is controlled to increase the discharge flow volume in dependence on the difference yaw rate $\Delta Y$ Obviously, numerous further modifications and variations of the present invention are possible in light of the above teachings. It is therefore to be understood that within the scope of the appended claims, the present invention may be practiced otherwise than as specifically described herein.

What is claimed is:

1. A variable gear ratio hydraulic power steering device having a variable ratio transmission mechanism for varying a rotation transmission ratio between a first steering shaft coupled to a steering handle and a second steering shaft coupled to a pinion shaft, a transmission ratio controlling controller for controlling the variable ratio transmission mechanism, a flow volume control valve for controlling a discharge flow volume of an oil pump which circulates operating fluid, a valve controlling controller for controlling the flow volume control valve, and a steering angle sensor for measuring a handle steering angle input to the steering handle, wherein:

the variable ratio transmission mechanism is provided with a drive motor having a rotor and a stator combined and a rotational angle sensor for measuring a measured ACT angle which is a motor rotational angle of the drive motor, and is constructed to alter the rotation transmission ratio between the first and second steering shafts in dependence on a rotational operation of the drive motor;

the transmission ratio controlling controller is constructed to take therein the handle steering angle measured by the steering angle sensor and to control the variable ratio transmission mechanism in dependence on at least the handle steering angle and a handle angular velocity which is obtained by time-differentiating the handle steering angle;

the valve controlling controller is constructed to take therein the measured ACT angle and the handle steering angle and to calculate a target ACT angle which is a control target value of the motor rotational angle of the drive motor, in dependence on the handle steering angle; and the valve controlling controller is also constructed to control the flow volume control valve so that the discharge flow volume is made to be equal to or greater than a predetermined flow volume when a difference ACT angle which is the difference between the target ACT angle and the measured ACT angle is equal to or greater than a threshold value and so that the discharge flow volume is made to be less than the predetermined flow volume when the difference ACT angle is less than the threshold value.

2. A variable gear ratio hydraulic power steering device having a variable ratio transmission mechanism for varying a rotation transmission ratio between a first steering shaft coupled to a steering handle and a second steering shaft coupled to a pinion shaft, a transmission ratio controlling controller for controlling the variable ratio transmission mechanism, a flow volume control valve for controlling a discharge flow volume of an oil pump which circulates operating fluid, a valve controlling controller for controlling the flow volume control valve, and a steering angle sensor for measuring a handle steering angle input to the steering handle, the variable gear ratio hydraulic power steering device further comprising:

a vehicle speed sensor for measuring a vehicle speed which is the speed of a vehicle; and a yaw rate sensor for measuring a measured yaw rate which is a turn speed speed of the vehicle; wherein:

the valve controlling controller is constructed to take thereinto the measured yaw rate, the vehicle speed and the handle steering angle and to calculate an inferred yaw rate based on the vehicle speed and the handle steering angle; and the valve controlling controller is further constructed to execute a control under which the flow volume control valve increases the discharge flow volume in dependence on a difference yaw rate which is the difference between the inferred yaw rate and the measured yaw rate.

3. The variable gear ratio hydraulic power steering device as set forth in claim 2, wherein the transmission ratio controlling controller obtains the difference yaw rate and rotates the second steering shaft by the use of the variable ratio transmission mechanism so that the difference yaw rate approaches to zero.

4. The variable gear ratio hydraulic power steering device as set forth in claim 2, wherein:

the variable ratio transmission mechanism is provided with a drive motor having a rotor and a stator combined and a rotational angular sensor for measuring a measured ACT angle which is a motor rotational angle of the drive motor, and is constructed to alter the rotation transmission ratio between the first and second steering shafts in dependence on a rotational operation of the drive motor;

the valve controlling controller is constructed to take thereinto the measured ACT angle and the handle steering angle and to calculate a handle angular velocity and the rotation transmission ratio for the variable ratio transmission mechanism based on the handle steering angle and the measured ACT angle; and the valve controlling controller is constructed to calculate a pinion angular velocity which is a rotational angular velocity of the pinion shaft, by multiplying the rotation transmission ratio with the handle angular velocity and to execute a control under which the flow volume control valve increases the discharge flow volume in dependence on a magnitude of the pinion angular velocity.

5. A variable gear ratio hydraulic power steering device having a variable ratio transmission mechanism for varying a rotation transmission ratio between a first steering shaft coupled to a steering handle and a second steering shaft coupled to a pinion shaft, a transmission ratio controlling controller for controlling the variable ratio transmission mechanism, a flow volume control valve for controlling a discharge flow volume of an oil pump which circulates operating fluid, a valve controlling controller for controlling the flow volume control valve, and a steering angle sensor for detecting a handle steering angle input to the steering handle, wherein:

the variable ratio transmission mechanism is provided with a drive motor having a rotor and a stator combined and a rotational angular sensor for measuring a measured ACT angle which is a motor rotational angle of the drive motor, and is constructed to alter the rotation transmission ratio between the first and second steering shafts in dependence on a rotational operation of the drive motor;

the valve controlling controller is constructed to take thereinto the measured ACT angle and the handle steering angle and to calculate a handle angular velocity and the rotation transmission ratio for the variable ratio transmission mechanism based on the handle steering angle and the measured ACT angle; and the valve controlling controller is further constructed to calculate a pinion angular velocity which is a rotational angular velocity of the pinion shaft, by multiplying the rotation transmission ratio with the handle angular velocity and to execute a control under which the flow volume control valve increases the discharge flow volume in dependence on a magnitude of the pinion angular velocity.

6. The variable gear ratio hydraulic power steering device as set forth in claim 5, further comprising:

a vehicle speed sensor for measuring a vehicle speed which is the speed of a vehicle; and a yaw rate sensor for measuring a measured yaw rate which is a turn speed of the vehicle; wherein:

the valve controlling controller is constructed to take thereinto the measured yaw rate, the vehicle speed and the handle steering angle and to calculate an inferred yaw rate which is estimated, based on the vehicle speed and the handle steering angle; and the valve controlling controller is further constructed to execute a control under which the flow volume control valve increases the discharge flow volume in dependence on a magnitude of a difference yaw rate which is the difference between the inferred yaw rate and the measured yaw rate.

7. The variable gear ratio hydraulic power steering device as set forth in claim 6, wherein the transmission ratio controlling controller obtains the difference yaw rate and rotates the second steering shaft by the use of the variable ratio transmission mechanism so that the difference yaw rate approaches to zero.

* * * * *